Dec. 25, 1956     O. H. BANKER     2,775,105
TORSIONAL VIBRATION ABSORBER
Filed Feb. 10, 1954
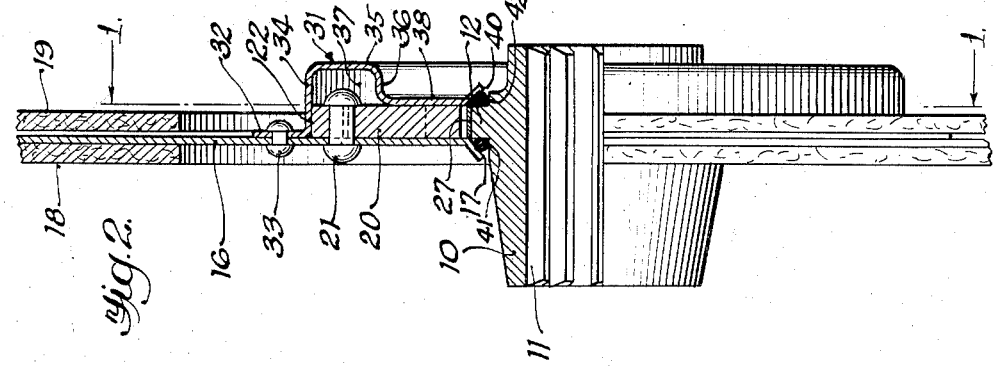
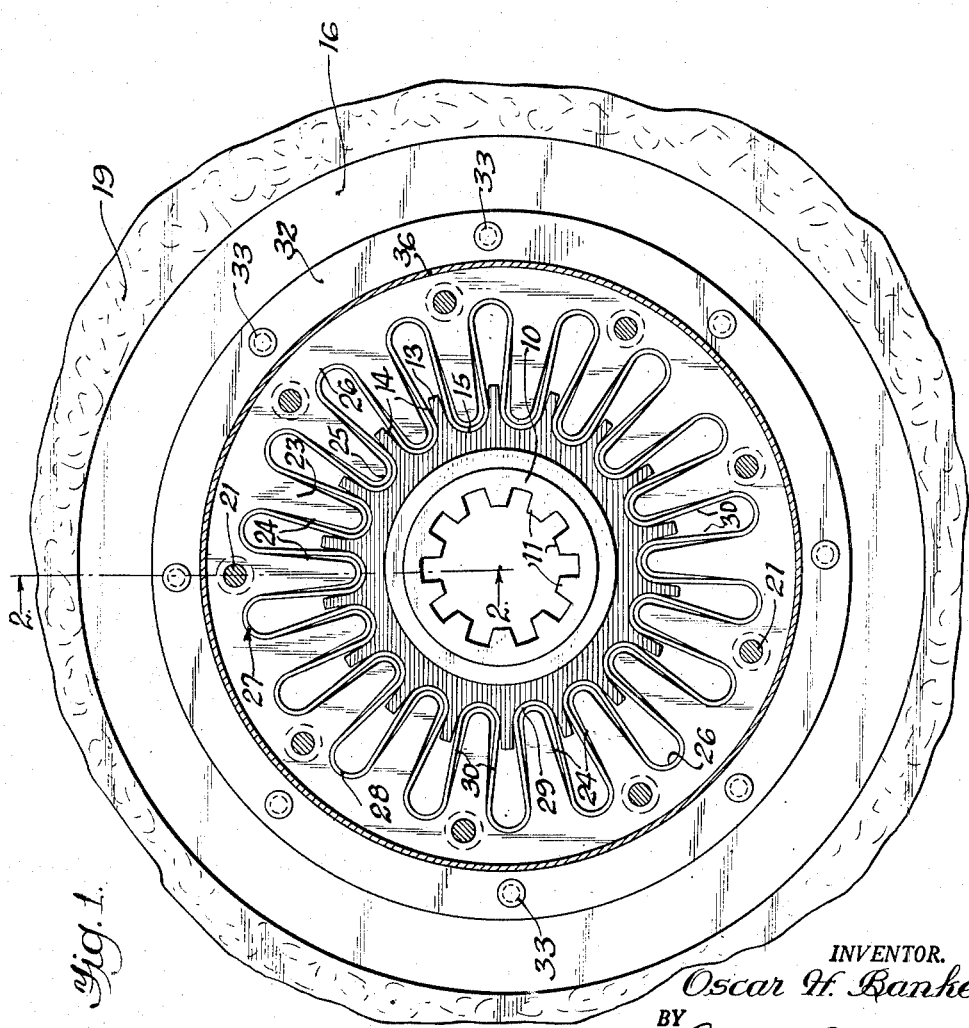
INVENTOR.
Oscar H. Banker
BY
Charles J. Vojtech
Atty.

United States Patent Office 2,775,105
Patented Dec. 25, 1956

2,775,105
TORSIONAL VIBRATION ABSORBER

Oscar H. Banker, Evanston, Ill., assignor to New Products Corporation, Chicago, Ill., a corporation of Delaware Application February 10, 1954, Serial No. 409,363

3 Claims. (Cl. 64—27)

This invention relates to a torsional vibration absorber for a friction clutch and the like. Although this invention will be described herein as applied to the hub of a friction clutch plate such as is used to connect an internal combustion engine to a change speed transmission in automotive vehicles, it is understood that this invention may be applied with equal facility to any machine element which is required to receive or transmit torque such as a coupling for a rotating shaft, a brake, or any of the intermittent motion transmitting mechanisms presently available for transmitting power.

Whenever an internal combustion engine is connected to a load through a friction clutch, the explosions in the engine are transmitted through the clutch to the load in the form of angular vibrations which may be harmful or unpleasant, or both. One device presently employed to prevent or reduce the transmission of such vibrations through a clutch is a special hub for the driven plate of the clutch, wherein the hub and plate are formed as independent members connected together through a plurality of helical springs arranged with their axes disposed circumferentially of the axis of rotation of the clutch. Suitable friction means may be provided between the hub and plate to dampen the vibrations of the springs.

In these vibration absorbing devices the springs obviously must be soft enough to yield under the impulses imparted to them by the engine if they are to be effective in the absorption of vibrations between the plate and hub. It frequently happens, however, that a sudden load is impressed on the driven part of the clutch plate, or a burst of power is suddenly applied to the driving part of the plate, either one of which may be sufficiently great to cause the springs to be compressed to their solid condition. Repeated operation of the springs in such solid condition is very harmful to them, resulting in breakage and the ultimate failure of the clutch. If the springs were made stiff enough to avoid operation in their solid condition when the severest anticipated load is impressed upon the plate, then the springs would be too stiff to prevent the transmission of vibrations.

The principal object of this invention is to provide a vibration absorbing mechanism, in a rotatable mechanical power transmitting system, which will be effective to prevent the transmission through the device of angular vibrations such as are normally encountered in the system, and which will not be harmed when a sudden load is impressed upon the device in excess of the normal load.

A more specific object of this invention is to provide a vibration absorbing mechanism for a rotary mechanical power transmitting device which comprises loosely interfitting teeth on the driving and driven members of the device, and resilient means in the form of a strip of spring material interposed between the interfitting teeth, said strip normally maintaining the teeth resiliently in separated condition and permitting slight relative angular movement between the driving and driven members such as may be produced by vibrations in one of the members, the strip merely being compressed over a substantially undistorted portion thereof between the interfitting teeth when an unexpected excessive load is applied to one or the other of the members, thereby preventing a destructive hammering of one portion of the resilient means upon another.

A feature of this invention is the provision of a chamber for the vibration absorbing means which is filled with a lubricant, the lubricant cooperating with the remainder of the mechanism to provide a dash pot action for the device.

These and other objects and features of this invention will become apparent from the following detailed description when taken together with the accompanying drawings in which:

Fig. 1 is a front elevational view, partly in section, of a fragment of a clutch plate showing the details of construction of the vibration absorbing means of this invention as applied thereto, the section being taken along line 1—1 of Fig. 2, and Fig. 2 is a side elevation of the clutch plate of Fig. 1 shown partly in section, the section being taken along line 2—2 of Fig. 1.

Referring now to the drawings for detailed description of the invention, the clutch plate is comprised of a hub member 10 having internal splines 11 formed in the central opening therein, the splines being adapted to engage external splines on a shaft or the like forming part of the mechanical power transmitting system of which the clutch plate is a part. This system may be the drive from an internal combustion of an automotive vehicle to the rear wheels thereof. Neither the shaft nor the system are shown since they form no part of the invention. Said hub member 10 is formed with a flange 12 extending radially outwardly from the region of hub 10 located somewhat to the right of the center of the hub as viewed in Fig. 2. The radially outer region of flange 12 is serrated as shown in Fig. 1 to form a plurality of thin, relatively widely spaced teeth 13, each tooth having slightly radially outwardly converging straight sides 14 connected by a rounded bottom 15.

Formed independently of hub 10 is a relatively thin flat disc 16 having a central opening 17 therein through which extends the left-hand portion of hub 10 as viewed in Fig. 2 with the inner region of the disc abutting the side of flange 12. Opening 17 is slightly larger than the portion of hub 10 received therein to insure freedom of angular movement of hub 10 within disc 16.

Near the outer periphery of disc 16 are disposed friction facings 18 and 19, one on either side of disc 16. Friction facing 18 is preferably secured directly to disc 16 by any suitable means, and facing 19 may be secured to the opposite side of disc 16 through the intermediary of thin finger type springs (not shown) after the usual practice in the clutch art to permit a smooth engagement of the plate by the succeeding member in the power train.

Near the central region of disc 16 is disposed an annulus 20 which is preferably of the same thickness, measured axially, as flange 12. Annulus 20 is secured to disc 16 by a plurality of rivets 21 preferably equidistantly spaced about the outer region of annulus 20 so that the annulus is constrained to rotate with disc 16. The outer peripheral surface 22 of annulus 20 is cylindrical, but the inner periphery is serrated as shown in Fig. 1, the serrations extending throughout the greater portion of the radial dimension of annulus 20 to form long teeth 23 extending radially inwardly toward flange 12. In the form chosen to illustrate this invention there is one tooth 23 for each space between teeth 13 on flange 12, each tooth 23 having substantially straight sides 24 which are divergent from the inner ends of the teeth to the radially outer regions thereof. The ends of teeth 23 are rounded, the center of curvature coinciding substantially with the center of curvature of the rounded bottoms 15 between the teeth 13 on flange 12. The rounded ends 25, and the sides 24 of teeth 23, are normally spaced from sides 14 and bottom 15 of teeth 13 as shown in Fig. 1. To relieve teeth 23 of bending stresses, they are hydrogen brazed to disc 16.

The bottoms 26 between adjacent teeth 23 are similarly well rounded, and due to the length of teeth 23 as compared with the length of teeth 13, said bottoms 26 are considerably removed from the ends of teeth 13.

A resilient driving connection is effected between disc 16 and its annulus 20 and hub member 10 by means of a resilient strip 27 of spring steel or the like which passes around the ends of teeth 13 and 23 and between the sides of the teeth as an undulated band. Each undulation has an outer crest 28, the contour of which coincides substantially with the contour of the rounded bottom 26 between teeth 23, and an inner crest 29 which contacts and substantially coincides with the rounded bottom 15 between teeth 13 on hub member 10. The connecting portions 30 between crests 28 and 29 are substantially straight and form, in effect, finger type leaf springs. The thickness of the material of resilient strip 27 is less than the depth of the space between the ends of teeth 23 and bottom 15. In one form which has been found successful of the depth of the space is substantially twice the thickness of the strip. This permits slight angular movement between hub 10 and disc 16 such as might be occasioned by the angular vibration of one of the members while the other member is rotated at a constant angular velocity.

When there is relative rotation between hub 10 and disc 16 in the limited sense permitted by the space between interfitting teeth 13 and 23, crests 28 and 29 rock in their respective bottoms which, in turn, changes the angularity of the connecting portions 30 relative to the radius of disc 16. If the direction of rotation is clockwise as viewed in Fig. 1, the disc 16 is a driving member and hub 10 is connected to the load so as to constitute a resistance, the portion 30 adjacent the drive side of a tooth 23, which under no-load conditions is inclined with respect to a radius, tends to straighten out to coincide with the radius, and then change its inclination in the opposite sense relative to the radius. The other connecting portion 30 is likewise initially inclined to a radius of disc 16 but will merely tend to increase that inclination. These tendencies cause a distortion in the shape of the undulations which is resisted by the resilience of the material of the strip 27, and in this manner provides a means for transmitting torque from disc 16 to hub 10 while at the same time yielding under vibrations so that hub 10 may be rotated at a constant speed while disc 16 may have slight angular vibrations superimposed upon its rotation.

Since teeth 23 and 13, and strip 27, are symmetrically formed about radii passing through the center of the teeth, the operation of strip 17 to absorb angular vibrations will be the same when the direction of drive is the same but hub 10 is the driver and disc 16 is driven.

Inasmuch as the rocking of crests 28 and 29 in the bottoms 15 and 26 may cause abrasion between strip 27 and hub 10 and annulus 20, means are provided for lubricating the crests to avoid undue wear. The means is comprised of a stamping 31 having a radially extending flange 32 at its outer periphery by which it is secured, through rivets 33, to the right-hand side as viewed in Fig. 2, of disc 16. Adjacent flange 32 is a shoulder 34 which fits snugly over the outer cylindrical surface 22 of annulus 20, and a radially inwardly extending portion 35 which is spaced from annulus 20 as shown in Fig. 2. A second shoulder 36 disposed radially inwardly from shoulder 34 forms, with portion 35, shoulder 34 and annulus 20, a chamber 37 which may be packed with lubricant at the time the vibration absorber is assembled at the factory. Shoulder 36 is of slightly lesser diameter than the diameter of a circle passing through crests 28 so that the lubricant within chamber 37 is in communication with strip 27 and can readily find its way to all parts of the strip.

Stamping 31 terminates in a radially inwardly extending portion 38 which fits snugly against the right-hand side of annulus 20 as viewed in Fig. 2, and overlies the right-hand side as viewed in Fig. 2, of flange 12. A central opening 40 in portion 38 permits the right-hand portion of hub 10 to extend therethrough. It may be observed that strip 27, flange 12 and annulus 20 are of identical widths measured in an axial direction, and that disc 16 and portion 38 of stamping 31 form closure members for the ends of the teeth 13 and 23 on hub 10 and annulus 20, respectively. As the lubricant in chamber 37 fills the spaces between the teeth, limited relative angular movement between the teeth results in a compression of the lubricant which is, of course, resisted by the lubricant and hence a dash-pot action is created for restraining such limited angular movement. The resistance to movement ceases when the lubricant passes around the end of a tooth 25 to the opposite side of the tooth from the one receiving the drive. Thus, the lubricant trapped in the space between teeth is alternately squeezed from one side to the other of each tooth as the relative angular vibratory movement between the teeth takes place, and this alternate passage from one side to the other assists in absorbing such vibratory movement between the torque transmitting members 10 and 16.

The entrapment of the lubricant is assured by flaring the inner regions of disc 16 and portion 38 outwardly to form spaces into which are compressed suitably compounded rubber O-rings 41 and 42 which seal off the lubricant at flange 12. The O-rings also function to provide a frictional damping force which retards free vibration of resilient strip 27.

In the event that a load of unusual magnitude, or a sudden burst of power is impressed upon one or the other of the members, such as is beyond the resilient limits of strip 17, relative movement between the teeth will take place until strip 17 is compressed between a tooth 13 and an adjoining tooth 23 on annulus 20. Such compression, however, has no deleterious effect upon the material of strip 17 such as would occur if a similar condition caused a coil type spring to be compressed to its solid condition. One tooth serves as a support for the portion of strip 27 interposed between itself and a tooth in the other member, and because of this support, the life of strip 27 is considerably greater than the life of a coil spring under similar conditions.

It is apparent that this invention is not limited in its application to clutch discs, but may be applied wherever it is desired to prevent the transmission of angular vibrations from one portion of a mechanical drive to another, regardless of the form that that portion of the drive may take. Thus, this invention may be applied with equal facility to a brake mechanism, a ratchet mechanism, etc. It is understood, therefore, that the scope of the invention is not to be limited to the foregoing description but is to be determined by the appended claims.

I claim:

1. A torsional vibration absorber comprising driving and driven members, an annulus on one of the members and having radially inwardly extending teeth, radially outwardly extending teeth on the other member fitting loosely within the spaces between the radially inwardly extending teeth, and resilient means connecting the teeth on the members to provide a drive therebetween, said means comprising a strip of resilient material formed to fit between the teeth on the members and passing alternately around the ends of the teeth of said members, said strip being of lesser thickness than the depth of the space between the sides of adjacent teeth and contacting corresponding portions of the teeth of the members one of said members overlapping the other member on one side of the teeth on both members, and having frictional contact with the other member, a plate secured to the said one member and passing around the other side of the teeth on both members and having frictional contact with the other member to define a chamber around the teeth and strip, and a lubricant in said chamber, the said frictional contact providing a damping force for the resilient strip.

2. A torsional vibration absorber comprising driving and driven members, an annulus on one of the members and having radially inwardly extending teeth, radially outwardly extending teeth on the other member fitting loosely within the spaces between the radially inwardly extending teeth, and resilient means connecting the teeth on the members to provide a drive therebetween, said means comprising a strip of resilient material formed to fit between the teeth on the members and passing alternately around the ends of the teeth of said members, said strip being of lesser thickness than the depth of the space between the sides of adjacent teeth and contacting corresponding portions of the teeth of the members, said strip and said teeth on the members being of substantially the same width, means bearing against the ends of the teeth and strip to define a chamber around the teeth and strip, a fluid in the chamber and filling the interstices between the teeth and strip, said strip causing the fluid to pass from one side of a tooth around one end of the tooth to the other side of said tooth upon relative angular movement between the members, to produce a dash-pot effect upon the said relative angular movement between the members.

3. A torsional vibration absorber comprising driving and driven members, an annulus on one of the members and having radially inwardly extending teeth, radially outwardly extending teeth on the other member fitting loosely within the spaces between the radially inwardly extending teeth, and resilient means connecting the teeth on the members to provide a drive therebetween, said means comprising a strip of resilient material formed to fit between the teeth on the members and passing alternately around the ends of the teeth of said members, said strip being of lesser thickness than the depth of the space between the sides of adjacent teeth and contacting corresponding portions of the teeth of the members, one of said members comprising a plate having a central opening therein, said annulus being secured to one side of said plate, and an annular stamping secured to the plate and having a recess into which the annulus extends, said stamping closely fitting the side of the central region of the annulus opposite the said one side of the plate, and being spaced from said annulus at the outer regions of the teeth thereof to form a reservoir in communication with the spaces between the teeth and a lubricant substantially filling the reservoir.

References Cited in the file of this patent

UNITED STATES PATENTS

| 1,017,819 | Sundh | Feb. 20, 1912 |
| 1,268,632 | Schauffelberger | June 4, 1918 |
| 2,562,166 | Bendall | July 31, 1951 |